(12) United States Patent
Kaminosono

(10) Patent No.: US 6,897,905 B2
(45) Date of Patent: May 24, 2005

(54) TELEVISION WITH BUILT-IN DVD DEVICE

(75) Inventor: Takeshi Kaminosono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 475 days.

(21) Appl. No.: 09/938,230

(22) Filed: Aug. 23, 2001

(65) Prior Publication Data

US 2002/0024614 A1 Feb. 28, 2002

(30) Foreign Application Priority Data

Aug. 23, 2000 (JP) ........................................ 2000-006045

(51) Int. Cl.[7] .............................................. H04N 5/64
(52) U.S. Cl. ...................... 348/836; 348/787; 348/794
(58) Field of Search .................................. 348/607, 608, 348/552, 836, 787, 794; 386/1, 45, 46, 125, 126; H04N 5/64

(56) References Cited

U.S. PATENT DOCUMENTS 5,673,090 A * 9/1997 Higuchi et al. ............. 348/836
5,718,605 A * 2/1998 Morikawa et al. .......... 439/607
6,172,712 B1 * 1/2001 Beard ......................... 348/552
6,434,326 B1 * 8/2002 Kondo et al. ............... 386/125
6,532,004 B1 * 3/2003 Harrison et al. ............ 345/169

FOREIGN PATENT DOCUMENTS

| JP | 8-307783 | 11/1996 |
| JP | 11-220680 | 8/1999 |

OTHER PUBLICATIONS

Patent Abstracts of Japan, Publication No. 11–220680, dated Aug. 10, 1999.

* cited by examiner

Primary Examiner—John Miller
Assistant Examiner—Trang U. Tran
(74) Attorney, Agent, or Firm—Osha & May L.L.P.

(57) ABSTRACT

In a configuration in which a cabinet is formed by an insulating material, there are provided a filter substrate 3 for electrically connecting a DVD device 1 to a television circuit substrate 5 and a shielding case 2 for covering the DVD device 1 and the filter substrate 3.

21 Claims, 3 Drawing Sheets

TELEVISION WITH BUILT-IN DVD DEVICE

BACKGROUND OF THE INVENTION

1. Technical Field

The present invention relates to a television with a built-in DVD device in which a cabinet is formed by an insulating material, and more particularly to a television with a built-in DVD device in which a DVD device and a filter substrate connecting the DVD device to a television circuit substrate are covered with a shielding case.

2. Related Art

A DVD reproducing device radiates noise with a very large level due to an influence of processing of a digital image signal acting as animation. Because of this, a level of high-frequency noise radiated to the outside of a cabinet has been reduced by using a metal in the cabinet (called a first conventional art).

Also, in order to avoid complication of workability, a lead wire having a connector connected to a television circuit substrate has been used in a path for connecting the television circuit substrate to a filter inserted into a path for connecting the DVD reproducing device to the television circuit substrate for performing processing of an analog image signal (called a second conventional art).

Also, in a television with a built-in CD reproducing device, a conventional art for reducing noise occurring from the CD reproducing device has been proposed as the Unexamined Japanese Patent Application Publication No. Hei8-307783. That is, in this art, an operation of the CD reproducing device is stopped when a CD has not been inserted into the CD reproducing device. Also, when a CD has been inserted into the CD reproducing device, only a clock generating part of a voice system or a clock generating part of a video system is operated according to a kind of the inserted CD. Therefore, a level of radiation acting as interference is reduced (called a third conventional art)

[Problems to be Solved]

However, in the case of attempting to build the DVD reproducing device into a television, the following problems have been caused when the first conventional art is used. That is, when the DVD reproducing device and the television are integrated and a cabinet is formed of metal, a shape of the cabinet is large, so that a device becomes heavy. Also, a price of the cabinet increases.

And, an effect obtained by forming the cabinet of metal results in attenuation of unnecessary radiation to the cabinet outside. Because of this, the following problems cannot be solved.

That is, a television circuit for processing a signal of television becomes a circuit for processing a signal of an analog system. On the other hand, the DVD reproducing device becomes a device for obtaining an analog image signal finally by performing digital signal processing of a digital image signal recorded on an optical disk and a D/A conversion. And, a clock frequency becomes a very high frequency. Because of this, a level of high-frequency noise radiated from the DVD reproducing device is very large. Therefore, when both of a television circuit substrate and the DVD reproducing device are provided inside one cabinet, the noise radiated from the DVD reproducing device enters the television circuit substrate. As a result of that, a situation in which the noise mixes into a screen or a voice of the television has been caused.

Also, the following problems have been caused when the second conventional art is used. That is, it is necessary to have a margin of length in a lead wire for forming a path from a filter to the television circuit substrate, so that a bend occurs in the lead wire after the connection. Also, a shape of this bend varies largely every device. On the other hand, a level of high-frequency noise radiated from the lead wire becomes large as the lead wire becomes long. Also, the level varies largely depending on a bend condition of the lead wire. As a result of that, a level of the high-frequency noise radiated to the cabinet outside or a level of the high-frequency noise entering the television circuit substrate is large and the level varies largely every device.

Also, in the DVD reproducing device, a voice is reproduced simultaneously when an image is reproduced. Because of this, as in the third conventional art, a configuration in which only one generating part of a clock generating part of a video system and a clock generating part of a voice system is operated cannot be applied. That is, when the DVD reproducing device and the television are integrated, the third conventional art becomes an art difficult to apply.

SUMMARY OF THE INVENTION

The invention is created to solve the problems, and by covering a DVD device and a filter substrate for connecting the DVD device to a television circuit substrate with a shielding case, in a configuration in which a cabinet is formed by an insulating material, an object of the invention is to provide a television with a built-in DVD device capable of reducing an influence of noise generated by the DVD device on the television circuit substrate while reducing a level of unnecessary radiation to the outside of the cabinet.

Also, in addition to the object, by arranging the DVD device and the filter substrate in the vicinity each other and also forming a shielding cover for covering the DVD device and the filter substrate in a single case shape, another object is to provide a television with a built-in DVD device capable of simplifying a processing step of the shielding case while preventing upsizing of a shape of the shielding case.

Also, in addition to the object, by electrically connecting the television circuit substrate to the filter substrate through metal pins, a further object is to provide a television with a built-in DVD device capable of more reducing an influence of noise generated by the DVD device on the television circuit substrate and eliminating variations in characteristics about noise radiation while more reducing a level of unnecessary radiation to the outside of the cabinet without causing a deterioration of workability of a manufacturing step.

Also, in addition to the object, by providing the filter substrate and the television circuit substrate in the vicinity each other sandwiching a wall portion of the shielding case and shortening a path length of a signal path for connecting the filter substrate to the television circuit substrate, a further object is to provide a television with a built-in DVD device capable of performing a further reduction in a noise level radiated to the outside and further suppression of an influence of noise on the television circuit substrate.

Also, in addition to the object, by electrically connecting a ground level of a power substrate provided in the vicinity of the shielding cover to the shielding case, a further object is to provide a television with a built-in DVD device capable of improving resistance to fracture characteristics to static electricity given from the outside of the cabinet while further suppressing a level in which noise occurring in the inside of the shielding case leaks to the outside of the shielding case.

Also, in addition to the object, by directly connecting a pattern acting as the ground level of the secondary side of the power substrate to the shielding case to more reduce a connection impedance between the ground level of the secondary side and the shielding case, a further object is to provide a television with a built-in DVD device capable of further improving a shielding effect and the resistance to fracture characteristics to static electricity.

[Means for Solving the Problems]

In order to solve the problems, in a television with a built-in DVD device according to the invention, it is applied to the television with a built-in DVD device in which there are provided a DVD device for sending out an analog image signal obtained on the basis of a reproducing signal of a DVD and a television circuit substrate for processing the analog image signal and a cabinet is formed by an insulating material, and there are provided a filter substrate in which a filter for forming a path for electrically connecting the DVD device to the television circuit substrate and also reducing a noise component flowing from the side of the DVD device through the path is formed, and a shielding case for covering the DVD device and the filter substrate.

That is, the shielding case electromagnetically shields the DVD device and the filter substrate in a relation to the outside of the shielding case. Also, the filter substrate reduces high-frequency noise leaking to the outside of the shielding case through a path for electrically connecting the DVD device to the television circuit substrate.

Also, in addition to the configuration, the shielding case comprises a shielding pedestal made of a metal plate with a substantially plane shape and a shielding cover mounted in the shielding pedestal, and the DVD device and the filter substrate are arranged in the vicinity each other on the shielding pedestal, and the shielding cover for covering the DVD device and the filter substrate is formed in a single case shape.

That is, the DVD device and the filter substrate are arranged in the vicinity, so that the shielding cover for covering the DVD device and the filter substrate is miniaturized. Also, the shielding cover is in a single case shape, so that a complicated processing step is not required.

Also, in addition to the configuration, the television circuit substrate is electrically connected to the filter substrate through metal pins whose one ends are fixed in one substrate of two kinds of the substrates of the television circuit substrate or the filter substrate and the other ends can be inserted into and extracted from a connector provided in the other substrate of two kinds of the substrates.

That is, a path for electrically connecting the filter substrate to the television circuit substrate constructs the shortest path with respect to a distance between the filter substrate and the television circuit substrate. Therefore, a path length exposed to the outside of the shielding case becomes shorter. Also, the path for connecting the filter substrate to the television circuit substrate has a constant position relation anytime with respect to the shielding case or the television circuit substrate. Also, the filter substrate is electrically connected to the television circuit substrate by only mounting the side of the shielding case in the side of the television circuit substrate so as to insert the other ends of the metal pins into the connector.

Also, in addition to the configuration, the filter substrate and the television circuit substrate are provided in the vicinity each other sandwiching a wall portion of the shielding case.

That is, a distance between the filter substrate and the television circuit substrate becomes shortest. Therefore, a length of the metal pins exposed to the outside of the shielding case becomes shortest, so that a level of high-frequency noise radiated from the metal pins to the outside of the shielding case is suppressed more.

Also, in addition to the configuration, a power substrate for supplying an operating power source is provided in the vicinity of the shielding cover and a ground level of the secondary side of the power substrate is electrically connected to the shielding case.

That is, the shielding case is connected to the ground level of the secondary side of the power source through a short path. As a result of this, a level in which noise occurring in the inside of the shielding case leaks to the outside of the shielding case is suppressed further. Also, a larger portion of electrostatic noise given from the outside of the cabinet flows to the side of the shielding case.

Also, in addition to the configuration, a pattern acting as the ground level of the secondary side of the power substrate is directly connected to the shielding case.

That is, the shielding case is connected to the ground level of the secondary side of the power source at very low impedance. As a result of this, a level in which noise occurring in the inside of the shielding case leaks to the outside of the shielding case is suppressed further. Also, a larger portion of electrostatic noise given from the outside of the cabinet flows to the side of the shielding case.

DETAILED DESCRIPTION OF THE PREFERRED EMBODIMENTS

[Mode for Carrying out the Invention]

An embodiment of the invention will be described below with reference to the drawings.

Figure 1A:
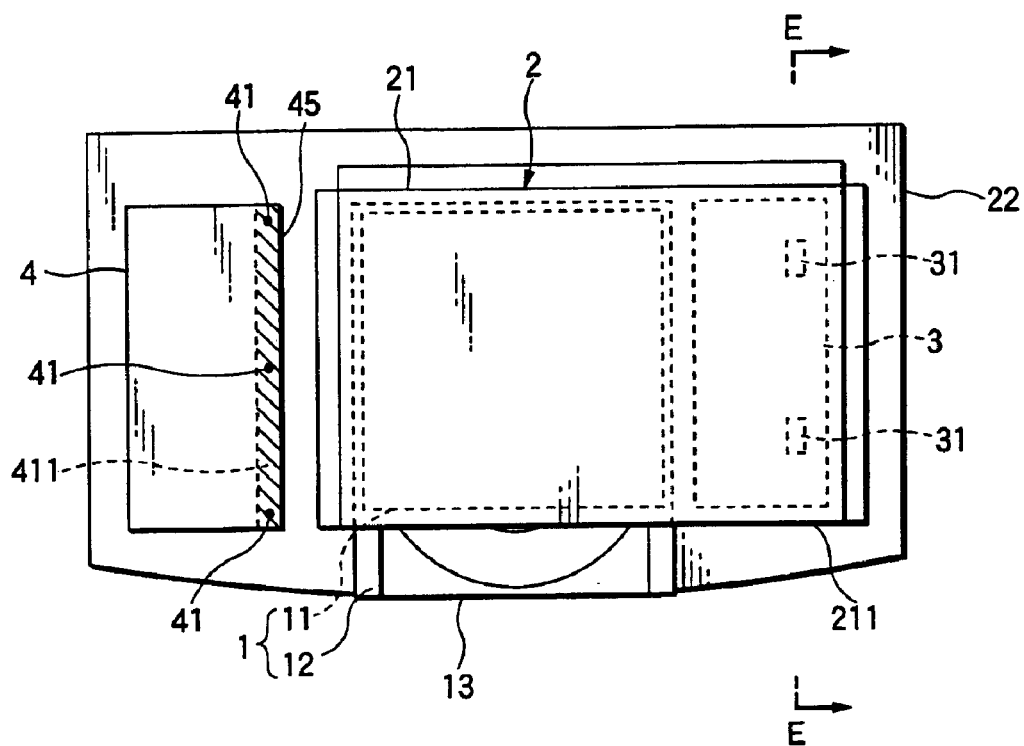
FIGS. 1A and 1B are a plan view and a front view showing a structure near a shielding case in one embodiment of a television with a built-in DVD device according to the invention.
Figure 1B:
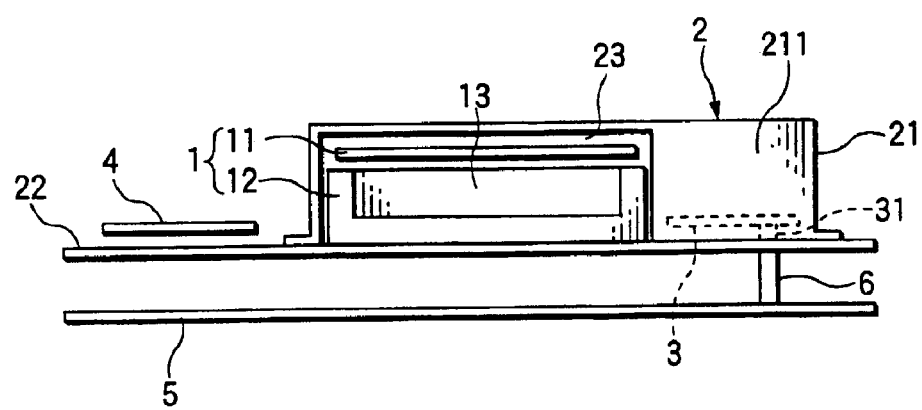
Figure 2:
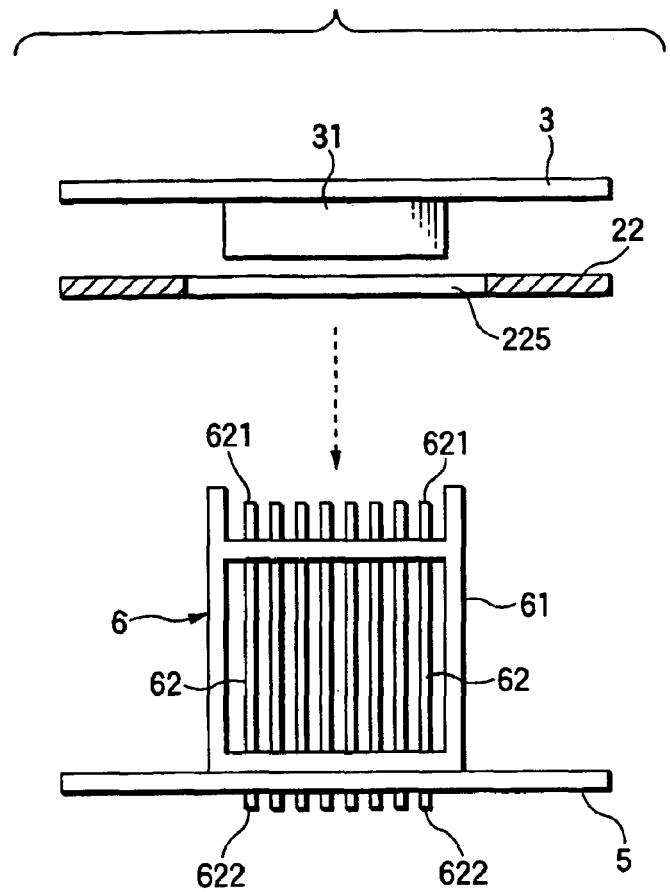
FIG. 2 is an illustration showing a part of a cross section taken on line E—E in FIG. 1.
Figure 3:
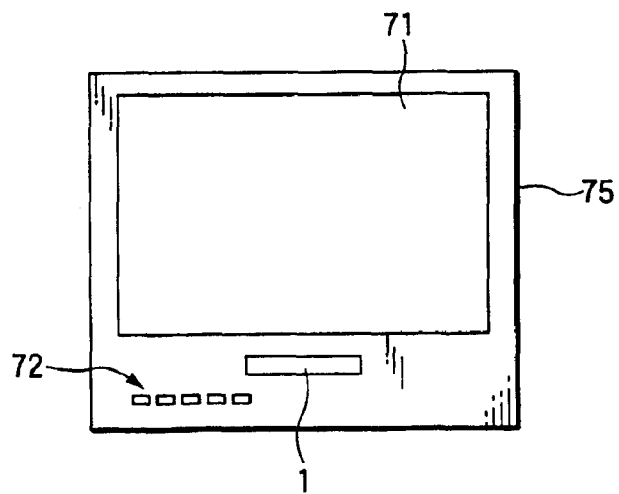
FIG. 3 is a front view showing an outward appearance of the embodiment.
Figure 4:
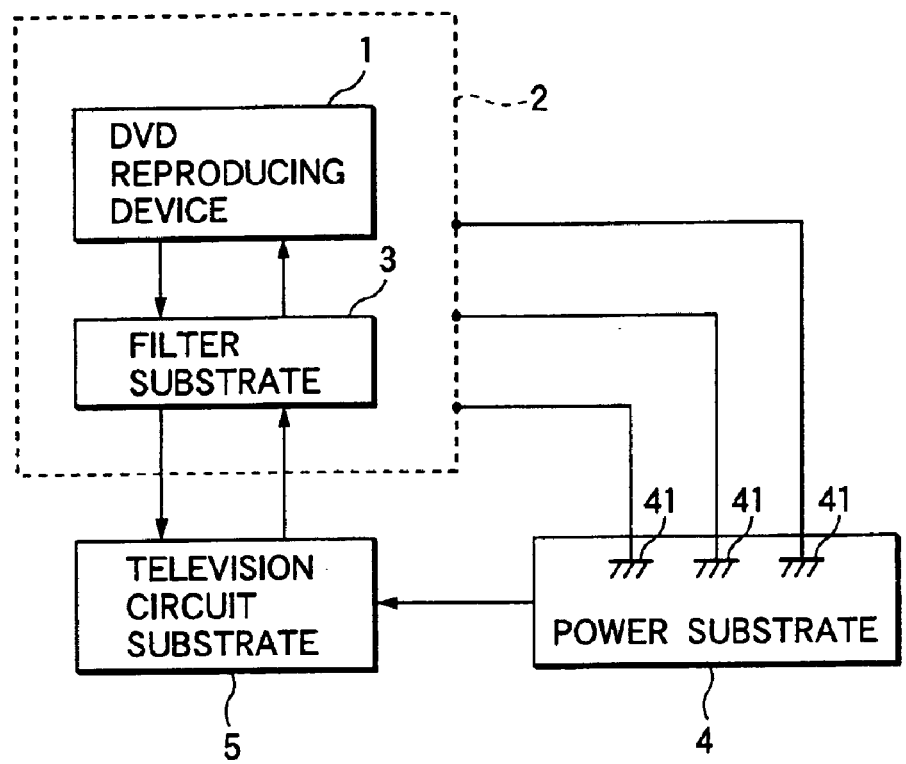
FIG. 4 is a block diagram showing an electrical connection of the embodiment.

FIGS. 1A and 1B are a plan view and a front view showing a structure near a shielding case in one embodiment of a television with a built-in DVD device according to the invention, and FIG. 2 is an illustration showing a part of a cross section taken on line E—E in FIG. 1, and FIG. 3 is a front view showing an outward appearance of the embodiment, and FIG. 4 is a block diagram showing an electrical connection of the embodiment.

In the drawings, a CRT 71 or a DVD device 1 is provided inside a cabinet 75 formed of an insulating material such as plastic. Also, key switches 72 for inputting various directions are provided below a front panel. That is, since the cabinet 75 is formed by an insulating material, in case that high-frequency noise occurs in the inside, the cabinet 75 has a structure difficult to shield the noise.

A television circuit substrate 5 mounted in substantially parallel with a base plate of the cabinet 75 provides a tuner or a processing circuit of a video signal below the cabinet 75. As a result of this, when reception of broadcast is directed by the key switches 72, the television broadcast is received and also the received image is displayed on the CRT 71.

Also, when reproduction of the DVD device 1 is directed, an analog image signal sent from the DVD device 1 is displayed on the CRT 71.

A shielding case 2 is constructed of a shielding pedestal 22 with a substantially rectangle and a substantially plane shape and a shielding cover 21, and the shielding pedestal 22 is formed by bending an iron plate. Also, the DVD device 1 is mounted substantially in the center of the upper portion of the shielding pedestal 22. Then, a filter substrate 3 adjacent to the DVD device 1 is mounted in the right side of the DVD device 1 and a power substrate 4 is mounted in the left side. Incidentally, support members for mounting the filter substrate 3 or the power substrate 4 in the shielding pedestal 22 are omitted in FIG. 1.

The shielding cover 21 is formed by bending an iron plate, and becomes a box with the lower portion opened, namely a single case shape, and is mounted to the shielding pedestal 22 so as to cover the DVD device 1 mounted to the shielding pedestal 22 and the filter substrate 3 from the upper side. Also, a notch 23 is formed in the range from the center to the left portion of a front wall 211 of the shielding cover 21 so as not to prevent a tray 13 of the DVD device 1 from moving forward. That is, except for the formation range of the notch 23, the whole circumference of the DVD device 1 and the filter substrate 3 is constructed so as to be covered with the shielding case 2.

The DVD device 1 includes the tray 13, and provides a mechanism part 12 equipped with a mechanism for moving the tray 13, a driving mechanism of a DVD or a pickup and a substrate 11 installed in the upper portion of the mechanism part 12. Then, a signal processing circuit for generating an analog image signal by processing a digital image signal reproduced from the DVD through the pickup is provided in this substrate 11.

The filter substrate 3 becomes a substrate in which a path for electrically connecting the DVD device 1 to a television circuit substrate 5 is formed, and reduces a high-frequency noise component which occurs in the DVD device 1 and leaks to the side of the television circuit substrate 5.

That is, a path by which an operating power source supplied from the power substrate 4 and guided through the television circuit substrate 5 is guided to the DVD device 1 is formed in the filter substrate 3. Also, a low-pass filter comprising a coil and a capacitor is provided in this path in order to eliminate the high-frequency noise leaking to the side of the television circuit substrate 5. Also, a path by which an analog image signal generated in the DVD device 1 is guided to the television circuit substrate 5 is formed. Also, a path for transmitting a control signal exchanged between the DVD device 1 and the television circuit substrate 5 is formed.

Incidentally, the substrate 11 of the DVD device 1 is electrically connected to the filter substrate 3 through an FFC (flexible flat cable), but this FFC is omitted in the drawing.

The power substrate 4 becomes a block for generating an operating power source of the television circuit substrate 5 and an operating power source of the DVD device 1 using a commercial power source as a primary side input. Incidentally, a pattern (showing the rough shape by a slash portion 411) acting as a secondary side ground level is formed along the vicinity of a side 45 along a longitudinal direction of the power substrate 4. Then, this pattern 411 is constructed so as to be electrically connected to the shielding pedestal 22 at three places shown by numeral 41.

Figure 5:
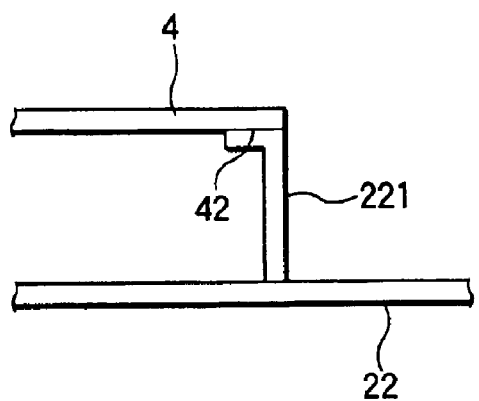
FIG. 5 is an illustration showing a connection point between a pattern for ground level of a power substrate and a shielding case.

That is, as shown in FIG. 5, in the shielding pedestal 22, a support member 221 for fixing the power substrate 4 is formed integrally with the shielding pedestal 22 in correspondence with the places shown by numeral 41 of the power substrate 4. Also, a pattern exposure part to which a resist material is not applied is formed in the places corresponding to numeral 41 of the pattern 411. As a result of this, when the power substrate 4 is mounted in the shielding pedestal 22 through the support member 221, a pattern 411 acting as a ground level in the power substrate 4 is electrically connected directly to the shielding pedestal 22 at the three places shown by numeral 41.

Incidentally, a mounting position of the power substrate 4 becomes a position near to a wall portion of the shielding cover 21 in a state in which the shielding cover 21 is mounted to the shielding pedestal 22 in order to set a connection impedance between the ground level and the shielding case 2 to a lower value. Also, the power substrate 4 is constructed so as to be supported by the shielding pedestal 22 through a support member (not shown) at three places in addition to the three places described above.

Also, the filter substrate 3 is constructed so as to be electrically connected to the television circuit substrate 5 through metal pins with a straight line shape. For this purpose, connectors 31 are mounted in two places of the filter substrate 3. Also, as shown in FIG. 2, a pin part 6 consisting of plural (for example, eight) metal pins 62 to 62 supported by a pin support member 61 is mounted in a position on the television circuit substrate 5 corresponding to the connectors 31. Also, ends 622 of the metal pins 62 are electrically connected to the television circuit substrate 5.

As a result of this, when the shielding pedestal 22 in which the filter substrate 3 is mounted is moved toward the side of the television circuit substrate 5 from the upper portion and is mounted to a predetermined position, the ends 621 of the metal pins 62 are inserted into an opening part 225 formed in the shielding pedestal 22 and are inserted into the connectors 31.

Then, when the shielding pedestal 22 is mounted in the predetermined position, the filter substrate 3 and the television circuit substrate 5 are provided in the vicinity position in parallel with each other sandwiching the shielding pedestal 22 which is a wall portion of the shielding case 2. Therefore, the filter substrate 3 and the television circuit substrate 5 are electrically connected each other through the metal pins 62 achieving the shortest path.

A function of the embodiment comprising the above-mentioned configuration will be described below.

The shielding cover 21 becomes a box with the lower portion opened, namely a single case shape. Because of this, the shielding case 2 formed by the shielding pedestal 22 and the shielding cover 21 electromagnetically shields the whole surface of the circumference of the DVD device 1 and the filter substrate 3 to the outside of the shielding case 2 (where the formation range of the notch 23 of the front wall 211 is excepted)

Therefore, high-frequency noise radiated from the DVD device 1, high-frequency noise radiated from the FFC (not shown) for connecting the DVD device 1 to the filter substrate 3 and high-frequency noise radiated from the filter substrate 3 are shielded by the shielding case 2. As a result of this, since the cabinet 75 is formed by an insulating material, high-frequency noise radiated to the outside of the cabinet 75 is reduced regardless of a structure difficult to shield the high-frequency noise by the cabinet 75.

Also, the DVD device 1 and the filter substrate 3 are provided in the vicinity each other, so that a shape of the shielding cover 21 is miniaturized. And, the shape of the shielding cover 21 is a single case shape, so that processing is facilitated.

Also, the filter substrate 3 and the television circuit substrate 5 are electrically connected each other through the metal pins 62 with a straight line shape. Therefore, a path for electrically connecting the filter substrate 3 to the television circuit substrate 5 constructs the shortest path with respect to a distance between the filter substrate 3 and the television circuit substrate 5.

Incidentally, radiation of high-frequency noise mixed into this path is generated from a portion exposed to the outside of the shielding case 2 of the path for connecting the filter substrate 3 to the television circuit substrate 5. Also, a level of the radiation increases as a path length exposed to the outside of the shielding case 2 becomes long. However, the path described above is formed by the metal pins 62, so that the path length exposed to the outside of the shielding case 2 becomes shortest with respect to the distance between the filter substrate 3 and the television circuit substrate 5. As a result of this, a level of high-frequency noise radiated from the path for connecting the filter substrate 3 to the television circuit substrate 5 to the outside is suppressed to an infinitesimal value.

Also, since the path for connecting the filter substrate 3 to the television circuit substrate 5 is formed by the metal pins 62 in which flexure or bend does not occur, a mutual position relation between this path and the shielding case 2 or the television circuit substrate 5 becomes a constant position relation anytime. Thus, variations in a level of high-frequency noise radiated from the metal pins 62 are eliminated. Therefore, there is no need for a correction of variations in a level of unnecessary radiation.

Also, the filter substrate 3 is electrically connected to the television circuit substrate 5 by only mounting the shielding case 2 in a predetermined position so as to connect ends 621 of the metal pins 62 to the connectors 31. Therefore, complexity of workability does not occur.

Also, the filter substrate 3 and the television circuit substrate 5 become a position relation in the vicinity in parallel with each other sandwiching the shielding pedestal 22 which is a wall portion of the shielding case 2. Because of this, a distance between the filter substrate 3 and the television circuit substrate 5 becomes shortest. As a result of that, a length of the metal pins 62 exposed to the outside of the shielding case 2 is minimized. As a result of this, a level of high-frequency noise radiated from the path for connecting the filter substrate 3 to the television circuit substrate 5 to the outside is greatly reduced.

Also, the power substrate 4 is located in the vicinity of the shielding case 2 and also a ground level of the secondary side of the power substrate 4 is electrically connected to the shielding case 2. As a result of that, the ground level of the secondary side is electrically connected to the shielding case 2 through a short path. Therefore, a level in which noise occurring in the inside of the shielding case 2 leaks to the outside of the shielding case 2 is suppressed further. Also, a larger portion of electrostatic noise given from the outside of the cabinet flows to the side of the shielding case 2, so that resistance to fracture characteristics to static electricity is improved.

Also, a method for connecting the ground level of the secondary side of the power substrate 4 to the shielding case 2 becomes a method for electrically connecting the pattern 411 acting as the ground level directly to the shielding case 2. Therefore, the shielding case 2 is connected to the ground level of the secondary side of the power source at very low impedance.

As a result of this, a level in which noise occurring in the inside of the shielding case 2 leaks to the outside of the shielding case 2 is suppressed more. Also, a larger portion of electrostatic noise given from the outside of the cabinet flows to the side of the shielding case 2, so that resistance to fracture characteristics to static electricity can be improved further.

[Effect of the Invention]

As described above, in a television with a built-in DVD device according to the invention, it is applied to the television with a built-in DVD device in which there are provided a DVD device for sending out an analog image signal obtained on the basis of a reproducing signal of a DVD and a television circuit substrate for processing the analog image signal and a cabinet is formed by an insulating material, and there are provided a filter substrate in which a filter for forming a path for electrically connecting the DVD device to the television circuit substrate and also reducing a noise component flowing from the side of the DVD device through the path is formed, and a shielding case for covering the DVD device and the filter substrate. Therefore, the shielding case electromagnetically shields the DVD device and the filter substrate in a relation to the outside of the shielding case. Also, the filter substrate reduces high-frequency noise leaking to the outside of the shielding case through a path for electrically connecting the DVD device to the television circuit substrate. As a result of this, an influence of noise generated by the DVD device on the television circuit substrate can be reduced while reducing a level of unnecessary radiation to the outside of the cabinet.

Also, the shielding case comprises a shielding pedestal made of a metal plate with a substantially plane shape and a shielding cover mounted in the shielding pedestal, and the DVD device and the filter substrate are arranged in the vicinity each other on the shielding pedestal, and the shielding cover for covering the DVD device and the filter substrate is formed in a single case shape. That is, the DVD device and the filter substrate are arranged in the vicinity, so that the shielding cover for covering the DVD device and the filter substrate is miniaturized. Also, the shielding cover is in a single case shape, so that a complicated processing step is not required. As a result of this, a processing step of the shielding case can be simplified while preventing upsizing of a shape of the shielding case.

Also, the television circuit substrate is electrically connected to the filter substrate through metal pins whose one ends are fixed in one substrate of two kinds of the substrates of the television circuit substrate or the filter substrate and the other ends can be inserted into and extracted from a connector provided in the other substrate of two kinds of the substrates. Therefore, a path for electrically connecting the filter substrate to the television circuit substrate is shortened and a path length exposed to the outside of the shielding case becomes short. Also, the path has a constant position relation anytime with respect to the shielding case or the television circuit substrate. And, the filter substrate is electrically connected to the television circuit substrate by only mounting the filter substrate so as to insert the other ends of the metal pins into the connector. As a result of this, a level of unnecessary radiation to the outside of the cabinet can be reduced more without causing a deterioration of workability of a manufacturing step. Also, an influence of noise generated by the DVD device on the television circuit substrate can be reduced more and variations in a level of noise radiation can be eliminated.

Also, the filter substrate and the television circuit substrate are provided in the vicinity each other sandwiching a wall portion of the shielding case. Therefore, a distance between the filter substrate and the television circuit substrate becomes shortest. As a result of that, since a length of the metal pins exposed to the outside of the shielding case becomes shortest, a level of high-frequency noise radiated from the metal pins to the outside of the shielding case is more suppressed, so that a further reduction in a noise level radiated to the outside and further suppression of an influence of noise on the television circuit substrate can be performed.

Also, a power substrate for supplying an operating power source is provided in the vicinity of the shielding cover and a ground level of the secondary side of the power substrate is electrically connected to the shielding case. Therefore, the shielding case is connected to the ground level of the secondary side of the power source through a short path. As a result of this, a level in which noise occurring in the inside of the shielding case leaks to the outside of the shielding case is suppressed further. Also, a larger portion of electrostatic noise given from the outside of the cabinet flows to the side of the shielding case. As a result of this, resistance to fracture characteristics to static electricity given from the outside of the cabinet can be improved while further suppressing a level in which noise occurring in the inside of the shielding case leaks to the outside of the shielding case.

Also, a pattern acting as the ground level of the secondary side of the power substrate is directly connected to the shielding case. Therefore, the shielding case is connected to the ground level of the secondary side of the power source at very low impedance. As a result of this, a level in which noise occurring in the inside of the shielding case leaks to the outside of the shielding case is suppressed further. Also, a larger portion of electrostatic noise given from the outside of the cabinet flows to the side of the shielding case. As a result of this, a shielding effect and the resistance to fracture characteristics to static electricity can be further improved.

What is claimed is:

1. A television with a built-in DVD device, comprising:
    a cabinet;
    a shielding case disposed within the cabinet;
    a DVD device disposed within the shielding case;
    a television circuit substrate disposed within the cabinet but outside the shielding case for processing an analog image signal generated by the DVD device; and
    a filter substrate disposed within the shielding case and operatively connected to both the DVD device and the television circuit substrate, the filter substrate acting to reduce a noise component flowing from the DVD device.

2. The television of claim 1, wherein:
    the shielding case comprises:
        a shielding pedestal made of a substantially planar metal plate, and
        a unitary shield cover mounted to the shield pedestal; and
    the DVD device and the filter substrate are mounted proximate to each other on the shielding pedestal.

3. The television of claim 2, wherein the television circuit substrate and the filter substrate are electrically connected by a plurality of metal pins extending through an aperture in the shielding pedestal.

4. The television of claim 2, wherein the filter substrate and the television circuit substrate are substantially parallel to each other so as to sandwich the shielding pedestal.

5. The television of claim 4, wherein the television circuit substrate and the filter substrate are electrically connected by a plurality of metal pins extending through an aperture in the shielding pedestal.

6. The television of claim 5, wherein the plurality of metal pins comprise straight pins each having a first end engaged with the television circuit substrate and a second end engaged with the filter substrate.

7. The television of claim 6, wherein the plurality of metal pins are removably engaged with a connector formed on at least one of the television circuit substrate and the filter substrate.

8. The television of claim 1, further comprising;
    a power substrate disposed outside and proximate to the shielding case, wherein a ground of the power substrate is electrically connected to the shielding case.

9. The television of claim 8, wherein the ground of the power substrate comprises a pattern acting as a ground level of a secondary side of the power substrate, and wherein the pattern is directly electrically connected to the shielding case.

10. The television of claim 1, wherein the television circuit substrate is mounted substantially parallel to a base plate of the cabinet.

11. The television of claim 1, wherein the shielding case comprises a shielding pedestal disposed proximate to and substantially parallel to the television circuit substrate.

12. The television of claim 10, wherein the shielding case comprises a shielding pedestal disposed proximate to and substantially parallel to the television circuit substrate.

13. The television of claim 1, wherein the shielding case comprises a shielding pedestal, wherein the DVD device is mounted on the shielding pedestal in a first area thereof, wherein the filter substrate is mounted on the shielding pedestal in a second area thereof, and wherein the filter substrate and the television circuit substrate are mutually located to sandwich the shielding pedestal.

14. The television of claim 1, wherein the filter substrate is disposed proximate a first side of the DVD device, and further comprising a power substrate disposed proximate an opposite side of the DVD Device.

15. The television of claim 14, wherein the power substrate is disposed outside the shielding case.

16. The television of claim 15, wherein the television circuit substrate is substantially parallel to both the power substrate and the filter substrate.

17. The television of claim 15, wherein the shielding case comprises a shielding pedestal, and wherein the shielding pedestal is sandwiched by the filter substrate and the television circuit substrate.

18. The television of claim 17, wherein the television circuit substrate and the filter substrate are electrically connected by a plurality of metal pins extending through an aperture in the shielding pedestal.

19. The television of claim 18, wherein the plurality of metal pins comprise straight pins each having a first end engaged with the television circuit substrate and a second end engaged with the filter substrate.

20. The television of claim 19, wherein the plurality of metal pins are removably engaged with a connector formed on at least one of the television circuit substrate and the filter substrate.

21. The television of claim 1, wherein the cabinet is formed of an insulating material.

* * * * *